United States Patent Office 3,340,000
Patented Sept. 5, 1967

3,340,000
DYEING COMPOSITION FOR CELLULOSIC AND
KERATINOUS MATERIALS
Albert Shansky, Bettswood, Norwalk, Conn., assignor to Turner Hall Corporation, New York, N.Y., a corporation of New York
No Drawing. Filed Apr. 14, 1966, Ser. No. 542,457
6 Claims. (Cl. 8—54)

The present application is a continuation-in-part of my copending application Ser. No. 314,850, filed Oct. 9, 1963, now abandoned, for Dyeing Compositions for Cellulosic and Keratinous Materials.

This invention relates to new compositions of matter for dyeing cellulosic and keratinous materials and, more particularly, to improved dyeing compositions including a fiber reactive dye.

A fiber reactive dye is a composition in which a reactive group containing one or more halogen atoms is attached to the dye, i.e. chromogeneous, molecule. The reactive group in the fiber reactive dyes is either a halo triazine or halo pyrimidine which contains one or more reactive halogen atoms. Presently available fiber reactive dyes are mono-azo halo triazines, mono-azo halo pyrimidines, anthraquinone halo triazines, anthraquinone halo pyrimidines, phthalocyanine halo triazines, and phthalocyanine halo pyrimidines, which are polysulfonated to give high solubility.

The structural formula of a typical halo triazine is:

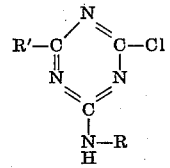

where R is the colored group and R' is the sulfonate group. The polysulfonate groups may be part of R, and R' simply a hydrogen atom; also, there may be sulfonate groups on both R and R'.

The structural formula of a typical halo pyrimidine is:

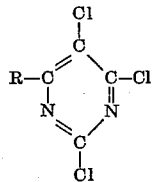

where R is the colored group and includes the sulfonate groups.

The following are typical fiber reactive dyes usable pursuant to the instant invention:

A *mono-azo monochlorotriazine.*—2.5 parachloro, 4 sulfate benzene, nitromethyl hydantoin, 1 mono-azo 2 sulfate 5 amino paramonochloroaminotrazine 4 sulfate (sodium salt).

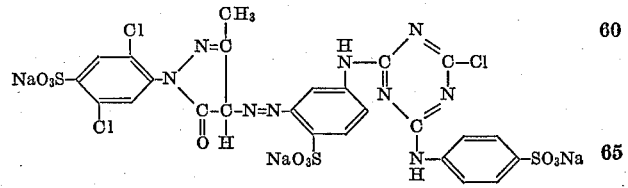

An *anthraquinone monochlorotriazine.*—8.11 para amino, 10 sulfate anthraquinone, ortho sulfate meta amino benzene, monochloro triazine ortho amino benzene sulfate (sodium salt).

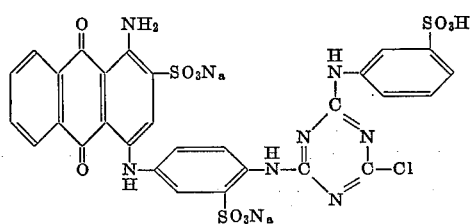

A *phthalocyanine monochlorotriazine.*—Monochlorotriazine amino benzene sulfate copper phthalocyanine trisulfate (sodium salt).

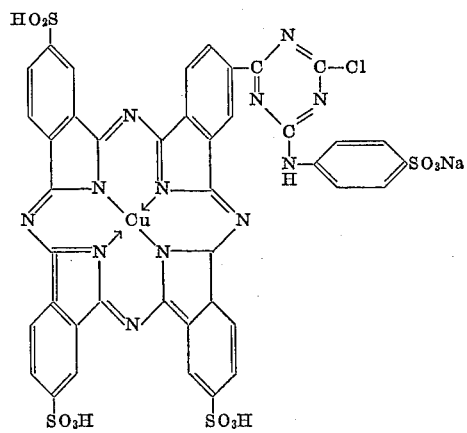

A *mono-azo dichlorotriazine.*—1 hydroxy 2 mono-azo benzene 3,7 sulfate 9 amino naphthalene dichlorotriazine (sodium salt).

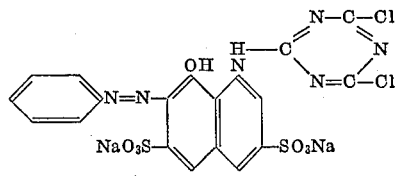

An *anthraquinone dibromotriazine.*—4,10 sulfate 8,11 para amino anthraquinone meta amino benzene sulfate dibromotriazine (sodium salt).

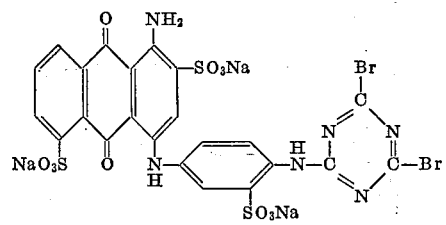

*A phthalocyanine trichloropyrimidine.*—Trichloropyrimidine copper phthalocyanine trisulfate.

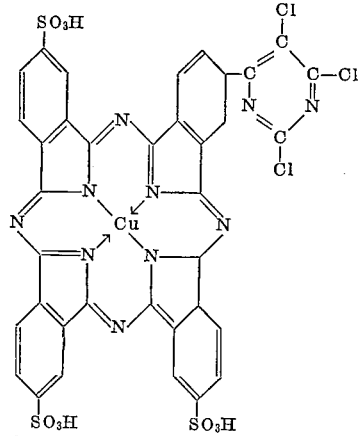

*A phthalocyanine dichlorotriazine.*—Dichlorotriazine copper phthalocyanine trisulfate.

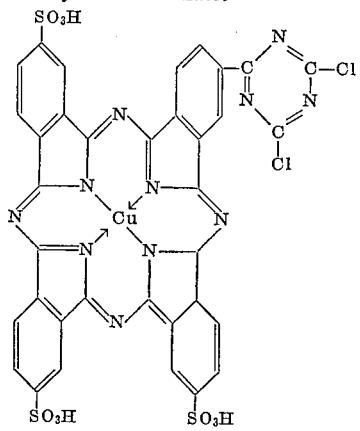

Dyeing with fiber reactive dyes has several advantages over dyeing by conventional aggregative and adsorption techniques. Chief among these advantages is true colorfastness which is caused by the formation of a covalent linkage between the dye molecule and the material being dyed, i.e. the dye is bonded to the material dyed. A detailed comparison of various dyeing methods employed for keratinous fibers is set forth in copending application Ser. No. 96,083, filed Mar. 16, 1961, and owned by the assignee of the instant application.

The fiber reactive dyes react with hydroxyl groups of cellulose according to the following equations:

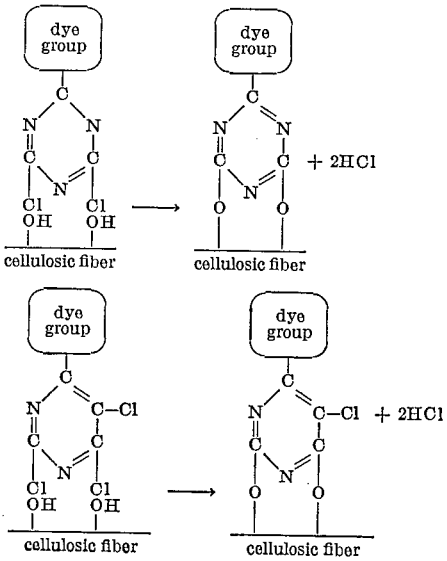

In the case of keratinous materials it has been found that the cystine linkages thereof and hydrogen bonds thereof must be broken in order for dyeing with fiber reactive dyes to take place. Breaking of the disulfide bonds is accomplished by a reducing agent according to the following equation:

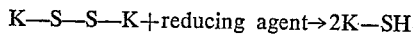

where K is a polypeptide chain.

Reduced keratin reacts with the fiber reactive dyestuff in the presence of a hydrogen bond breaker according to the following equations:

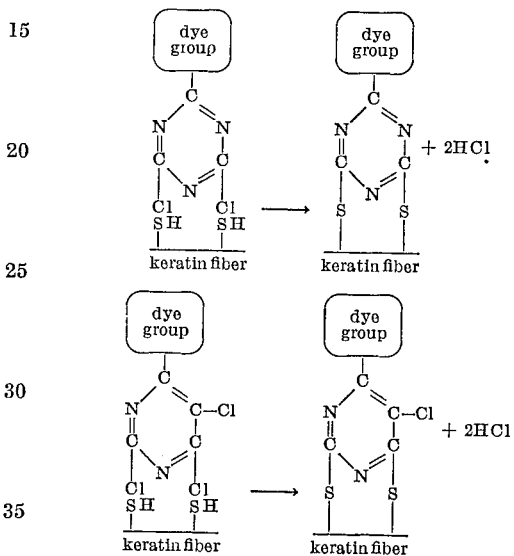

In dyeing by the aggregative and adsorption methods, dyeing behavior is controlled mainly by the rates of diffusion and affinity of the dyestuff. However, in dyeing with fiber reactive dyes reaction rates are involved. Basically, any dye that will react with cellulose or reduced keratin will also react with water. The reaction with water is according to the following equation:

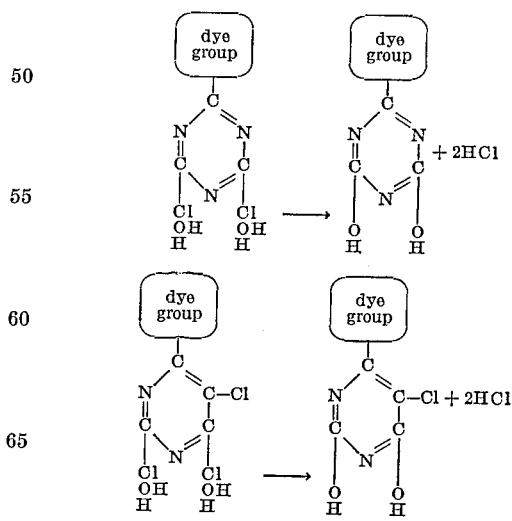

Thus, two competing reactions are set up, to wit: the main, i.e. dyeing, reaction between the dye and the material being dyed, on the one hand, and the side reaction between the dye and the water, on the other hand. Since the hydroxyl derivative of the dye produced by the reaction with water will not react with cellulose or reduced keratin, the side reaction of the dye and water leads to inactivation of the dye.

As is apparent from the foregoing, the relative speeds of the main reaction and the side reaction in the foregoing dyeing system are of vital importance. The main reaction must be much faster if the system and the fiber reactive dyes are to be of practical value.

Experience has shown that the side reaction, which is a first order reaction, is sufficiently rapid in relation to the main reaction to cause the dyeing compositions to decay rapidly. Said solutions become inactivated to cellulose or reduced keratin in approximately four hours. The rate of the side reaction increases greatly with increases in pH, temperature and concentration of the dye.

Commercial dyeing processes for cellulosic and keratinous fabrics require from 1½ to 3 hours. Thus, even if the fiber reactive dyeing solutions be made up immediately before use, the side reaction limits the practicality of dyeing with such solutions because the dye is constantly becoming inactive, i.e. losing strength, as the dyeing takes place. Still further, it is desirable for certain applications, for example, for inks, paints and hair dyes, that the dyes be sold as ready-made materials which need not be made up immediately prior to use. It has not been feasible with fiber reactive dyes to produce such ready-made solutions because the shelf-life thereof is almost nil.

The foregoing disadvantages of fiber reactive dyes have made use thereof on a commercial basis somewhat impractical and have made necessary the use of special skills and techniques. Use of other media than water is not possible because the dyes operate effectively only in aqueous medium. Thus, decay of the dyeing solutions during use and lack of shelf-life have always been serious drawbacks as explained above.

It is a principal object of the present invention to provide aqueous dyeing compositions for cellulosic and keratinous materials which compositions include a fiber reactive dye and do not become inactivated due to hydrolysis of the dye.

It is another object of the present invention to provide compositions of the character described which have a long shelf-life.

It is another object of the present invention to provide compositions of the character described which produce true colorfast dyeing.

It is another object of the present invention to provide dyeing compositions of the character described which can be inexpensively and simply produced.

Other objects of the invention in part will be obvious and in part will be pointed out hereinafter.

The invention accordingly consists of the compositions of matter hereinafter described and of which the scope of application will be indicated in the appended claims.

Pursuant to the instant invention, it has been found that the hydrolysis of the fiber reactive dye due to the side reaction described above can be almost entirely inhibited or delayed by introducing into the aqueous dye solution a substance which absorbs the water. A substance found to be usable for this purpose is a minutely particulate pyrogenic colloidal silica having a particle size on the order of about 0.015 to 0.020 micron. A product known as "Cab-O-Sil" is manufactured by the Cabot Corporation, 125 High Street, Boston, Mass., and has the foregoing physical characteristics. Accordingly, it is usable for the purposes of the instant invention. One gram of such silica contains 11 million billion particles and covers an area of about 200 square meters.

Said particulate silica is relatively insoluble in water. Thus, when more than the amount soluble in a given quantity of water is added to water, a colloidal dispersion is formed. In colloidal dispersion, said material is capable of absorbing tremendous amounts of water on its very large surface area. In accordance with the present invention, the aforesaid particulate silica is employed in the dyeing solutions including fiber reactive dyes so as to inhibit the side reaction of the dye and water by tying up the water molecules.

It has been found pursuant to the instant invention that solutions of fiber reactive dyes including the aforesaid particulate silica in the proper amounts as set forth below do not degenerate during use and have a commercially useful shelf-life. Still further, it has been found that addition of polar materials to a colloidal dispersion of said silica causes gellation to take place. This is useful where the fiber reactive dye solution is to be used for printing, since in many commercial printing processes the dye must be in the form of a gel.

The range of concentration of the aforesaid minutely particulate silica in the fiber reactive dye solution pursuant to the instant invention is from about 3% to about 5% by weight, the optimum concentration being about 4%. Less than 3% is insufficient to inactivate enough water to inhibit the hydrolysis (side) reaction as much as is necessary, whereas more than 5% causes the solution to be too thick. The pH of the final solution including said silica is from about 6 to about 9, the optimum being about 8. At pH's lower than 6 or higher than 9 the silica does not sufficiently inactivate the water.

In the examples of dyeing solutions and other solutions given below percentages are by weight.

The following is an example of a solution (dyebath) useful for dyeing cellulose fibers or fabrics.

*Example I*

| | Percent |
|---|---|
| Cab-O-Sil M–5 | 4.0 |
| Water | 95.5 |
| Procion brilliant red–H7BS | 0.5 | pH adjusted to 8 with sodium carbonate

The cellulose fibers or fabric (such as unbleached muslin) is first washed in a neutral soap bath and rinsed. It is then dried and placed in the above solution for twenty minutes. Next, it is removed from the dyebath, and finally it is rinsed in lukewarm water.

As already mentioned, keratinous materials cannot be dyed directly by the fiber reactive dyes. The keratin must first be reduced to provide reactive sulfhydryl groups, and the dyeing must be carried out in the presence of a hydrogen bond breaker. A full discussion of this subject will be found in copending application Ser. No. 96,083 aforesaid. In the case of light colored fibers such as white, grey or blond human hair, fur or wool, a pre-treatment with a reducing solution is employed prior to dyeing. A solution usable for this purpose is the following:

| | Percent |
|---|---|
| 28% aqueous ammonia | 10 |
| 52% aqueous ammonium thioglycolate | 16 |
| Water | 74 |

The keratinous fibers or fabric is immersed in the reducing solution for about 10 minutes; next, the material is rinsed in water and dried. The material can then be dyed with the following solution:

*Example II*

| | Percent |
|---|---|
| Cab-O-Sil M–5 | 4.00 |
| Water | 87.65 |
| Lithium bromide | 2.50 |
| Urea | 0.75 |
| NaCl | 5.00 |
| Procion rubine–H2BS | 0.10 | pH adjusted to 8 with sodium carbonate

The keratinous material is placed in the dye solution for about 20 minutes, then removed, washed in lukewarm water and dried.

In the case of colored or naturally dark keratinous fibers or fabrics such as dark pigmented human hair, fur or unbleached wool, the fiber or fabric is bleached before dyeing. For this purpose the following bleaching solution can be employed.

|  | Percent |
|---|---|
| 20% volume hydrogen peroxide in water | 66.6 |
| 28% ammonium hydroxide in water | 2.4 |
| Oleic acid | 6.2 |
| Isopropanol | 5.3 |
| Water | 19.5 |

The fibers or fabric is placed in the bleaching mixture for a period of three-quarters of an hour to one and one-half hours depending on the depth of the original color. As soon as decolorization has been effected, the fiber or fabric is removed from the bleach bath, rinsed in lukewarm water, and dried. The material can then be further pre-treated with the reducing solution set forth above and thereafter dyed with the dyeing solution of Example II. In the alternative, after bleaching the keratinous material can also be dyed directly by the following solution, i.e. without any further pre-treatment:

*Example III*

|  | Percent |
|---|---|
| Cab-O-Sil M–5 | 4.00 |
| Water | 85.90 |
| Lithium bromide | 2.50 |
| Sodium chloride | 5.00 |
| Sodium sulfite | 2.50 |
| Procion Yellow–HAS | 0.10 |
| pH adjusted to 8 with sodium carbonate | |

In Examples II and III the lithium bromide and urea are the hydrogen bond breakers. The solution of Example III includes in addition to the hydrogen bond breaker and dye a reducing agent, and this is why with Example III the reducing pre-treatment is eliminated. In other words, in Example III the reduction, hydrogen bond breaking and dyeing are carried out simultaneously. The use of sodium sulfite as the reducing agent makes the simultaneous reduction and dyeing possible because sodium sulfite does not include free sulfhydryl groups which could react with the halogen of the fiber reactive dye and thereby deactivate the same. Such deactivation would occur if ammonium thioglycollate were used as the reducing agent as is the case with the pre-treatment solution used prior to but not simultaneously with the dyeing solution of Example II.

The use of sodium sulfite in dyeing bleached hair is also desirable because it is milder than ammonium thioglycollate. This is of value because bleached hair is already weakened by the bleaching action and the less the reducing solution further degrades the hair, the better. The fact that the sodium sulfite is milder than ammonium thioglycollate does not prevent adequate dyeing from taking place because bleached keratinous materials have been found to require much less reduction then unbleached materials for dyeing with the fiber reactive dyes to be accomplished.

In discussing the use of dyeing and pre-treatment solutions mentioned above, reference has been made to removing the materials to be dyed from the solutions. Of course, if the material were hair on the human head, the solutions would have to be added to and removed from the hair.

Procion Brilliant Red–H7BS, Procion Rubine–H2BS, and Procion Yellow–HAS are monchlorotriazine type fiber reactive dyestuffs sold by the I.C.I. Organics, Inc. of Providence, R.I., the formulas for which are as follows:

Procion Brilliant Red–H7BS

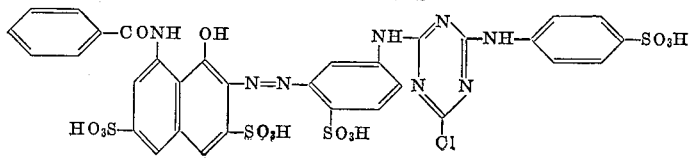

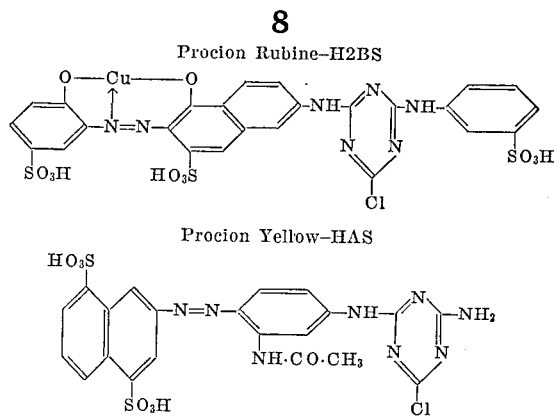

In addition to stabilizing the dyestuff against reaction to water, the minutely particulate silica has the ancillary property of acting as a thickening agent. This property is very useful with dyes used in printing since it prevents drippage and spillage and facilitates the making of printing pastes. The thickening is of a thixotropic nature so that the dyeing solutions made with said silica act as soft gels when at rest but like free flowing liquids when shear is applied. When fabric is run over a roller through a dyebath, the pulling on the fabric causes enough shear at the surface thereof to cause the dyeing gel applied thereto to become a liquid. Printing pastes based on the foregoing formulas will be free flowing at the time the printing plate or roller contacts the fabric or will be liquified by such contact. Likewise, in other methods of printing, insertion of brushes, pens and scribes and their movement across surfaces causes enough shear to liquify the dyeing compositions.

In connection with dyeing hair on the human head, the thixotropic aspect of solutions embodying the instant invention is also of importance. These solutions do not run or drip from the hair when they are applied, but the shear under which they are placed when combed or brushed into the hair causes them to liquify sufficiently to perform the dyeing.

As is apparent from the foregoing, the present invention makes possible stable aqueous solution of fiber reactive dyes for dyeing of cellulosic and keratinous materials. By means of the compositions embodying the present invention, true colorfast dyeing can be obtained and the time and method of application of the fiber reactive dyes is improved. The solutions of the fiber reactive dyes made pursuant to the instant invention do not become inactive during use and may be stored for long periods of time, for example, 8 months.

It thus will be seen that there are provided compositions of matter which achieve the several objects of the invention and are well adapted to meet the conditions of practical use.

As various possible embodiments might be made of the above invention and as various changes might be made in embodiments above set forth, it is to be understood that all matter hereinabove described is to be interpreted as illustrative and not in a limiting sense.

Having thus described the invention, there is claimed as new and desired to be secured by Letters Patent:

1. For use in dyeing cellulosic and reduced keratinous materials, an aqueous solution of a fiber reactive dye selected from the group consisting of polysulfonated mono-azo halo triazines, mono-azo halo pyrimidines, anthraquinone halo triazines, anthraquinone halo pyrimidines, phthalocyanine halo triazines, and phthalocyanine halo pyrimidines; and from about 3% to about 5% by weight of a minutely particulate pyrogenic colloidal silica.

2. An aqueous solution as set forth in cliam 1 wherein the pH is from about 6 to about 9.

3. An aqueous solution as set forth in claim 1 wherein the silica has a particle size on the order of about 0.015 to 0.020 micron.

4. For use in dyeing reduced keratinous materials, an aqueous solution of a fiber reactive dye selected from the group consisting of polysulfonated mono-azo halo triazines, mono-azo halo pyrimidines, anthraquinone halo triazines, anthraquinone halo pyrimidines, phthalocyanine halo triazines, and phthalocyanine halo pyrimidines; a hydrogen bond breaker; and from about 3% to about 5% by weight of a minutely particulate pyrogenic colloidal silica.

5. For use in dyeing keratinous materials which have not been previously reduced, an aqueous solution of a fiber reactive dye selected from the group consisting of polysulfonated mono-azo halo triazines, mono-azo halo pyrimidines, anthraquinone halo triazines, anthraquinone halo pyrimidines, phthalocyanine halo triazines, and phthalocyanine halo pyrimidines; a hydrogen bond breaker; a reducing agent; and from about 3% to about 5% by weight of a minutely particulate pyrogenic colloidal silica.

6. A solution as set forth in claim 5 wherein the reducing agent is sodium sulfite.

No references cited.

NORMAN G. TORCHIN, *Primary Examiner.*

J. HERBERT, *Assistant Examiner.*